United States Patent [19]

Alexander, Jr. et al.

[11] Patent Number: 4,908,759
[45] Date of Patent: Mar. 13, 1990

[54] HIERARCHICAL DATABASE CONVERSION WITH CONDITIONAL WRITE

[75] Inventors: Everett L. Alexander, Jr., Edison Township, Middlesex County; Allan R. Carlin, East Brunswick Township, Middlesex County; Alice L. Fiore, Edison Township, Middlesex County; Walter A. Mackiewicz, South Plainfield, all of N.J.

[73] Assignee: Bell Communications Research, Inc., Livingston, N.J.

[21] Appl. No.: 147,319

[22] Filed: Jan. 21, 1988

Related U.S. Application Data

[63] Continuation of Ser. No. 770,699, Aug. 29, 1985, abandoned.

[51] Int. Cl.⁴ .............................................. G06F 15/40
[52] U.S. Cl. .................................. 364/300; 364/200; 364/283.2; 364/282.1
[58] Field of Search ... 364/200 MS File, 900 MS File, 364/300

[56] References Cited

PUBLICATIONS

An *Introduction to Database Systems*, by C. J. Date, Third Edition, published by Addison-Wesley, 1981, pp. 273–386.

"Data Extraction, Processing, and Restructuring System; Program Description/Operations Manual", published by IBM Corporation, 1979.

*Primary Examiner*—Lawrence E. Anderson
*Attorney, Agent, or Firm*—James W. Falk; John T. Peoples

[57] ABSTRACT

A process for transitioning a hierarchical input database to create a hierarchical output database. The processing occurs generally in two stages. During the first stage, information contained in user-specified driver tables is utilized to extract only pertinent data from the input database and thereby produce intermediate data in a form accessible by the second stage. During the second stage, information from the driver tables is applied to the intermediate data to map this data to the required output form representative of the hierarchical output database. With this processing approach, the driver tables are derived and then maintained independently of underlying software that executes under control of the driver tables. A database conversion is efficiently effected by preparing the driver tables and then invoking execution of the common software embodying the extracting and mapping subprocesses.

5 Claims, 11 Drawing Sheets

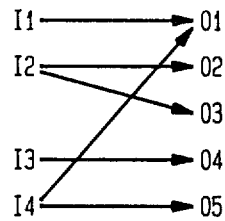
FIG. 3
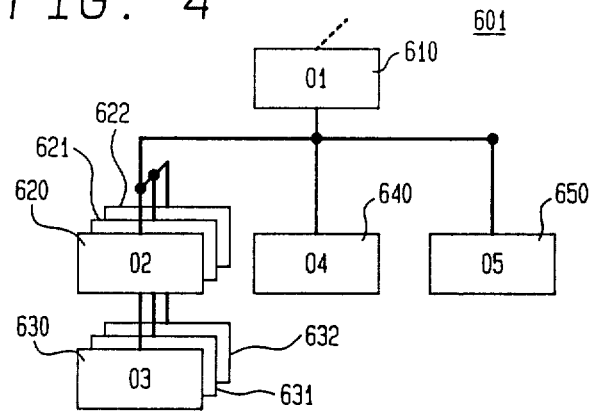
FIG. 4
FIG. 6

FIG. 8

| OUTPUT SEGMENT HIERARCHICAL LEVELS | | | | | | |
|---|---|---|---|---|---|---|
| 1 | | | | (01) | A　C　K | (i) |
| | 2 | | | (02) | E | (ii) |
| | | 3 | | (03) | F | (iii) |
| | | | 4 | (04) | H | (iv) |
| | 2 | | | (02) | E | (v) |
| | | 3 | | (03) | F | (vi) |
| | 2 | | | (02) | E | (vii) |
| | | 3 | | (03) | F | (viii) |
| | | | 5 | (05) | J | (ix) |
| 1 | | | | (01) | A　C　K | (x) |
| | 2 | | | (02) | E | (xi) |
| | | 3 | | (03) | F | (xii) |
| | 2 | | | (02) | E | (xiii) |
| | | 3 | | (03) | F | (xiv) |
| | 2 | | | (02) | E | (xv) |
| | | 3 | | (03) | F | (xvi) |
| | | | 5 | (05) | J | (xvii) |

HIERARCHICAL DATABASE CONVERSION WITH CONDITIONAL WRITE

This is a continuation of application Ser. No. 770,699, filed Aug. 29, 1985, now abandoned.

TECHNICAL FIELD OF THE INVENTION

This invention relates generally to computerized databases and, more particularly, to a methodology for transitioning a hierarchical input database to hierarchical output database comprising information derived from the input database, thereby altering its original hierarchical structure and content.

BACKGROUND OF THE INVENTION

In a hierarchical model of a database, items of information or data are represented by a tree-and-branch structure. This model of a database emphasizes the superior-inferior relationships between information items and is very suitable for data wherein such relationships are inherent, e.g., organization charts.

More specifically, a hierarchical database is defined as an ordered set of data wherein elements of data in the set are composed of different occurrences of a single type of database format. An occurrence in turn comprises an ordered arrangement of segments of data and, finally, a segment is defined in terms of a set of associated fields.

Oftentimes to satisfy updated design specifications, particularly in the development of large software systems, it is necessary to transition an existing database to a new database, usually by rearranging, modifying such as by additions and deletions or restructuring the existing database. Broadly speaking, the transitioning process converts field occurrences in the existing or input database to different field or segment occurrences in the new or output database.

With conventional conversion approaches, whenever database transitions are required, new database-specific transition software has been developed and tested each time the existing database is converted. For large system developments, this is inefficient since a significant portion of the programming effort and budgetary expenditure is devoted to the development of each database-specific transition.

SUMMARY OF THE INVENTION

These shortcomings and other deficiencies and limitations are obviated, in accordance with the present invention, by an essentially generic transition process that converts data fields from input database segments into corresponding fields in different or restructured output database segments. Thus, for instance, two input fields from different segments can be combined into one output segment.

In accordance with an illustrative embodiment of the present invention, the generic transition process is effected by executing user-independent, common software under control of a set of driver tables prepared by the user. These tables are derived and then maintained independently of the underlying, common software. The tables contain all the information necessary to effect complex decisions and conversions in moving input fields to output segments. The processing occurs in generally two stages. During the first stage, a subset of the information contained in the driver tables is utilized to extract pertinent data from the input database and thereby produce intermediate data in a form accessible by the second stage. During the second stage, information from the driver tables is applied to the intermediate data to map these data items to the required output form representative of the hierarchical database.

The organization and operation of this invention will be better understood from a consideration of the detailed description of an illustrative embodiment thereof, which follows, when taken in conjunction with the accompanying drawing.

BRIEF DESCRIPTION OF THE DRAWING

FIG. 3 is a representation of the required transition process to convert from the input to output databases;

FIG. 4 is a depiction of a database occurrence, including segments, of the hierarchical output database transitioned in accordance with FIGS. 2 and 3;

FIG. 6 is a more detailed representation of the data fields of FIG. 5 indicating that fields not required in transitioning (non-cross-hatched fields) may be bypassed during the extraction process;

FIG. 8 is a pictorial representation of data content of the output database of FIG. 1 as transitioned according to FIG. 3;

DETAILED DESCRIPTION

1. Overview

Figure 1:
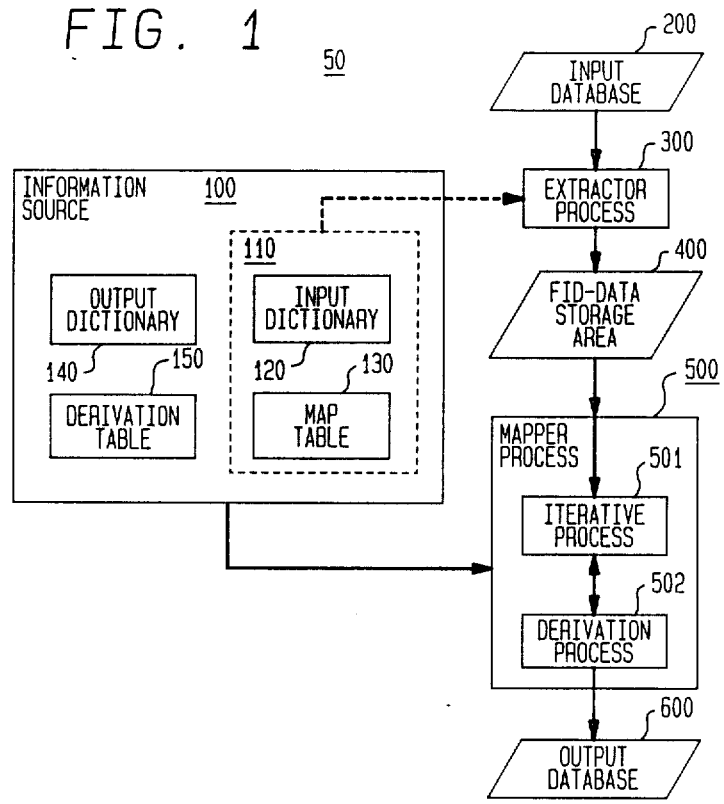
FIG. 1 is a block diagram of the generic transition process in accordance with an illustrative embodiment of the present invention.

With reference to FIG. 1, an embodiment of the generic transition process disclosed in overview fashion by block diagram 50 comprises extractor process 300 and mapper process 500, each executing in a general-purpose computer (not shown) under control of information provided by information source 100 stored in the computer. A representative computer is an IBM model 3081 having the OS/MVS type operating system with the IMS program product serving as the database management system.

Basically, extractor process 300 reads items of information or data contained in hierarchical input database 200 and, as directed by a portion of information source 100, namely, input source 110 comprising input dictionary 120 and map table 130, extracts relevant data from database 200 to produce the information stored in FID-Data (Field IDentifier-Data) storage area 400.

In addition, mapper process 500 reads from FID-Data 400 and, based on information provided by source 100, converts and then transfers the selected fields to hierarchical output database 600 in a format defined by the user via source 100. The total information content of source 100 is generally established by the user prior to the execution of the extractor and mapper processes, although it is possible to execute extraction process 300 with only input source 110 defined initially.

Figure 2:
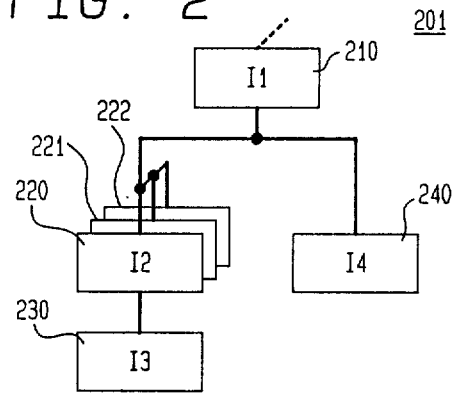
FIG. 2 is a depiction of a database occurrence, including segments, of an exemplary hierarchical input database.

In elucidating the transition process represented in the overview of FIG. 1, it is supposed that input database 200 has the hierarchical form represented by FIG. 2, which depicts one database record occurrence 201 from the database. Record 201 is composed of first level, parent, or root segment 210, second level, child or sibling segments 220 through 222 and 240 and third level or grandchild segment 230 of sibling segment 220. The data in each segment is represented by the prefix "I" (Input Data) combined with an order sequence number, as is the convention in ordering hierarchical databases (i.e., top-down, front-to-back, left-to-right). The data in each segment may be further partitioned into subcomponents called fields (not shown in FIG. 2 but to be discussed below). The database layout of FIG. 2 represents the general structure of a record occurrence. Specific occurrences may have one or more segments missing. For example, the second record occurrence may not contain the I3 segment.

FIG. 3 depicts a required transition of input database 200, thereby creating output database 600 of FIG. 1. The transitioning process yields the hierarchical form represented by FIG. 4, which depicts the general record occurrence 601 from the database. The data is represented by the prefix "O" (Output Data) and a sequence number. In the conversion, subsets of I2 are to be distributed to both segments 620 through 622 and 630 through 632 (O2 and O3, respectively); similarly, I4 is to be restructured to produce segments 610 and 650 (O1 and O5, respectively).

Figure 5:
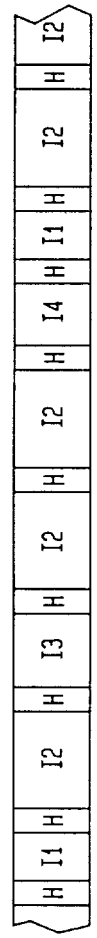
FIG. 5 is a pictorial representation of the input database of FIG. 2 in unloaded or sequentially accessible format.

Although input database 200 is shown in hierarchical form in FIG. 2, the unloaded or sequentially accessible version is the format actually operated on by extractor process 300. This unloaded format is shown in FIG. 5. The hierarchical database is unloaded in sequential format (i.e., top-down, etc.) and each segment is prefixed with a header (designated H in FIG. 5), which provides such information as the length of the actual data in each segment. Most main frame computer systems are configured with a database management system that will unload a hierarchical database to a sequential format by invoking a simple set of commands. Thus, the unloaded database is treated as the actual input into extractor 300; however, the unloading may also be considered a first processing step in extractor process 300 without loss of generality.

The data arrangement of FIG. 6 provides a more detailed view of the data contained in the "I" blocks of FIG. 5. For example, from line (i) of FIG. 6, I1 is composed of three fields, namely, fields A, B and C. Similarly, I2, I3 and I4 are composed of, respectively, three, three and two fields. Lines (i)-(vi) show the first record occurrence whereas lines (vii)-(xi) illustrate the second record occurrence. It is observed that there is no I3 entry in the second record occurrence. This is indicative of the fact that any record occurrence may be devoid of one or more segments.

Focusing again on line (i) of FIG. 6, field A actually comprises two sub-fields, field B also comprises two sub-fields and field C is made up of four sub-fields (sub-fields are delineated by vertical hash marks). The manner in which sub-fields are grouped to form the fields is controlled by the user in the definition of information source 100 of FIG. 1. In this instance, for example, it is presumed the user grouped the first two of the seven contiguous sub-fields, thereby defining field A, because these grouped sub-fields provided a data component required in an output data segment.

As is also depicted in FIG. 6, certain fields are shown as cross-hatched such as, for example, fields A and C on line (i). Cross-hatched fields mark those fields that are brought from input database 200 by extractor process 300. The data resulting from the extraction process, namely FID-data stored in area 400, is depicted generically in FIG. 7. The unloaded data stream is shown in sequentially accessible format as it might appear on a magnetic tape. This is merely illustrative since the representation also applies to any direct access storage device such as disk storage.

The field identifier names and the fields to be extracted are user generated and supplied to extractor 300 by input source 110. In producing the output database, the user did not require the information stored in certain fields. For example, the data in field B of I1 or field D of I2 is presumably superfluous, and this data is bypassed during the extraction process.

Figure 7:
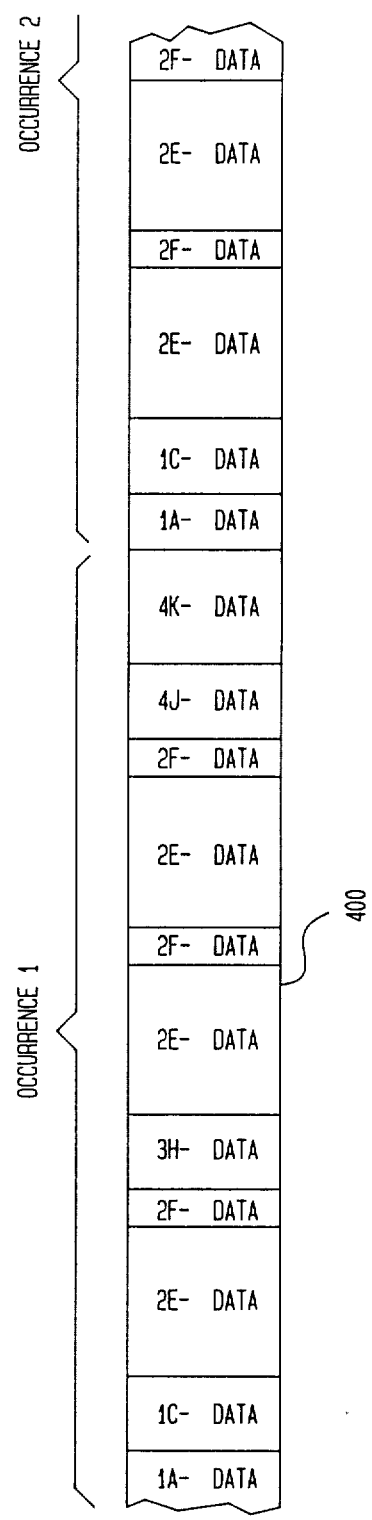
FIG. 7 depicts the ordering of FID-data pairs as extracted from the input data segments of FIG. 6.

Once the input data is converted to the format depicted by FIG. 7, the second major processing stage—represented by mapper process 500 in FIG. 1—is initiated. Mapper process 500 operates under control of information source 100 as provided by the user. Map table 130 of source 100 comprises entries which basically instruct process 500 to move input data fields to selected output data segments, as defined by output dictionary 140, either unconditionally or conditionally. A conditional move may be based, for instance, on the contents of a previously moved field or a combination of moved fields. Instructions for a conditional move generally result from invoking entries in derivation table 150. Broadly, in considering the interplay between source 100 and process 500, iterative process 501, a sub-process of mapper 500, generally executes in response to map table 130 and stores data in locations provided by output dictionary 140, whereas derivation process 502, also a sub-process of mapper 500, operates under control of iterative process 501 and instruction lists in derivation table 150.

The data arrangement depicted in FIG. 8 results from applying a particular specification of source 100 to transition process 50 described with respect to FIGS. 2 through 7. From FIG. 3, both I1 and I4 are mapped to O1; in particular, FIG. 8 indicates that fields A and C from I1 and field K from I4 are mapped in the order A,C,K. Such information is derived from map table 130 and is supplied to iterative process 501 during execution. In order to also demonstrate the interaction of iterative process 501 with derivation process 502, it is assumed that field K is moved only if some condition relative to field A is satisfied. This condition is supplied to derivation process 502 by appropriate entries in derivation table 150. For the first record occurrence of output database 600, represented by lines (i)-(ix) of FIG. 8, the condition on field A is presumably satisfied since field K on line (i) is moved. However, for the second record occurrence of FIG. 8 (lines (x)-(xvii)), the condition on field A is presumably not satisfied because field K on line (x) is not present (it is shown only as a dashed rectangle).

FIG. 8 is merely illustrative since only a portion of the data comprising database 600 is shown. For instance, certain information needed to construct the output header (similar to the header H of FIG. 5) has not been depicted in this overview description. Details pertinent to the configuration of database 600 will be provided in the sequel.

2. Transitioning Example

Figure 9:
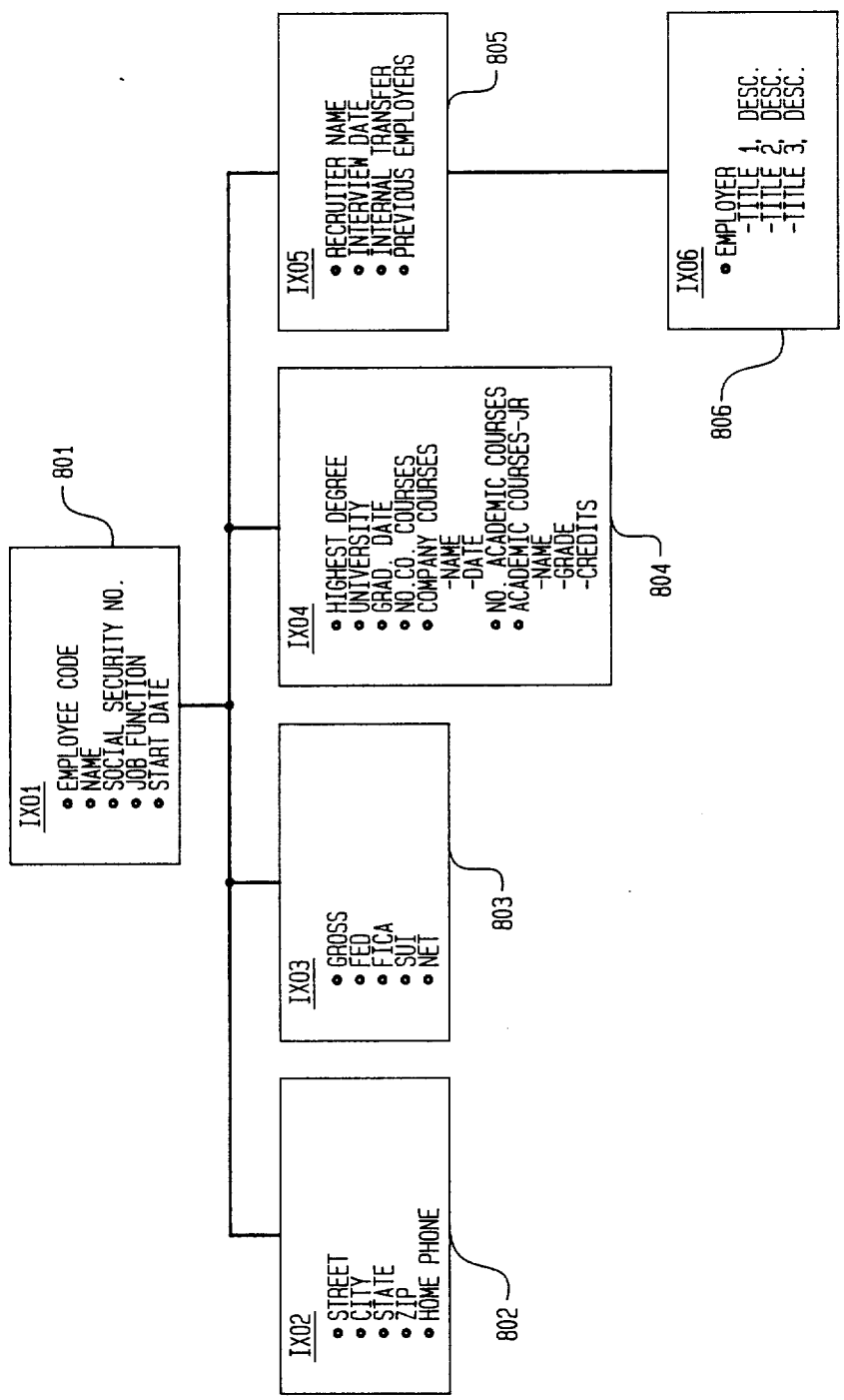
FIG. 9 is a hierarchical representation of an input database for an illustrative example.
Figure 10:
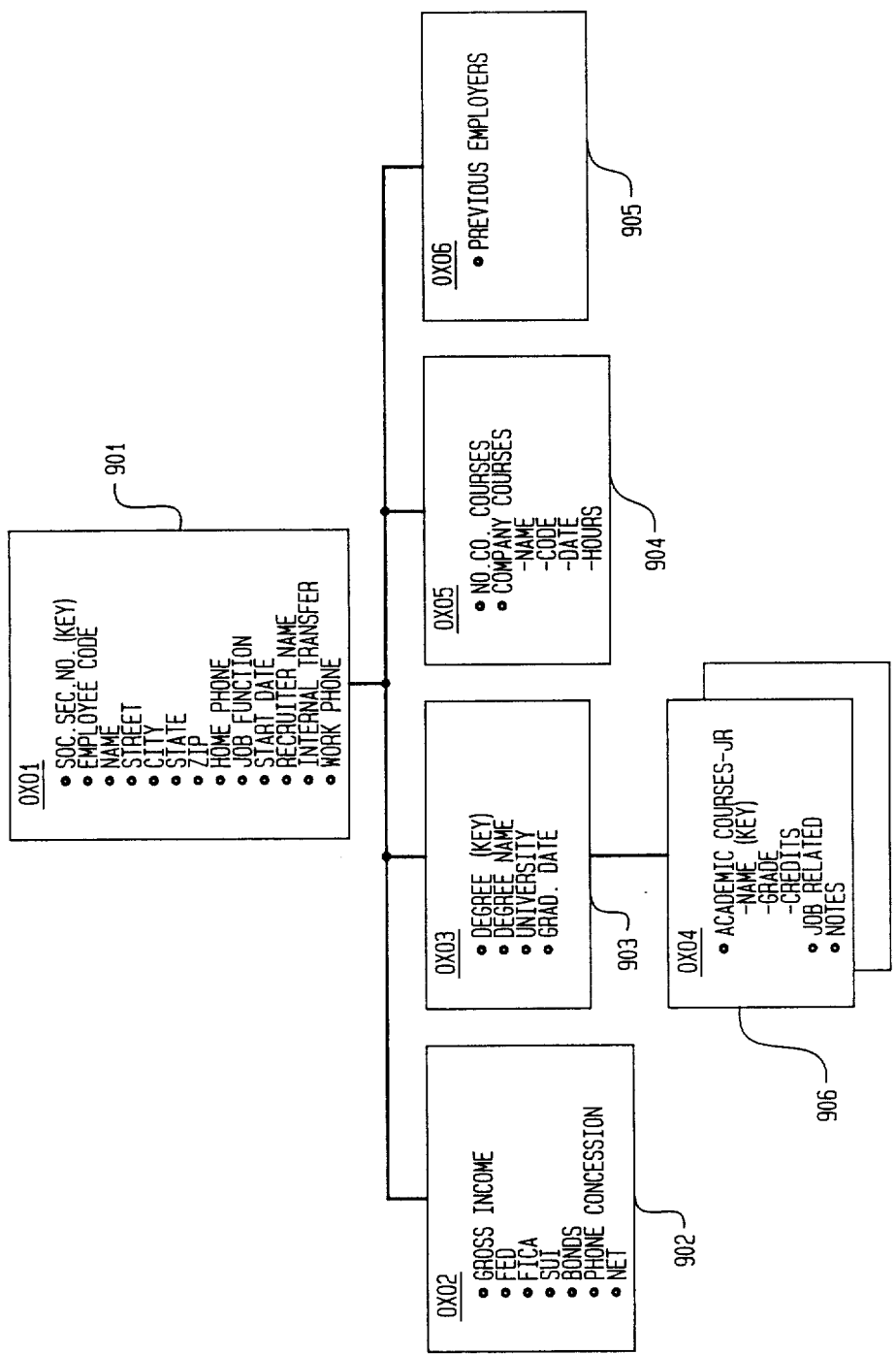
FIG. 10 is a hierarchical representation of an output database for the illustrative example.

This section presents a step-by-step example on the procedure for transitioning input database 200 to obtain restructured output database 600. FIG. 9 depicts the hierarchical structure of the hypothetical input database whereas FIG. 10 shows the structure of the output database. This so-called Employee Profile Data Base requires restructuring so that more specific personnel needs may be accommodated. Some of these needs include: space for an additional phone number, expanded academic and company course information, and added payroll benefits. In transitioning the database structure, there is a need to combine some segments into one; to expand some segments to include more information; to split one segment into two segments; to create twin segments from multiple occurrences of a data field in one segment; to change the data content of fields; to delete an entire segment; and to delete one field from an input segment.

In effecting a transitioning process, the user initially prepares a transition specification as an aid to defining information source 100. In the Employee Profile Data Base, there are up to six types of input segments (FIG. 9) and six types of output segments (FIG. 10) per occurrence. Some segments are of fixed length whereas others are of variable length, as presented in the specification below. The following restructuring is required:

1. Input segment IX01, depicted by block 801 in FIG. 9, is a fixed length segment containing the following fields: EMPLOYEE CODE, NAME, SOCIAL SECURITY NO., JOB FUNCTION and START DATE. Since a hierarchical database requires a "key" for reference purposes in the root segment, EMPLOYEE CODE is selected as the key for this example.

The corresponding output segment OX01 (block 901 in FIG. 10) is also of fixed length. It contains rearranged information from input segment IX01 as well as certain new information derived from input segments IX02 and IX05. Also, space for five more digits is to be added to the ZIP field and a blank area for a corresponding WORK PHONE is to be appended. The key for this output segment is SOCIAL SECURITY NO.

2. Input segment IX02 (block 802 in FIG. 9) is a fixed length segment containing the following fields: STREET, CITY, STATE, ZIP and HOME PHONE. The entire contents of this segment are to be merged into output segment OX01 so that all unique employee information is in the root segment.

3. Input segment IX03 (block 803 in FIG. 9) is a fixed length segment composed of these payroll fields: GROSS, FED, FICA, SUI and NET. This segment is to become new segment OX02 (block 902 in FIG. 10) in the output database. In addition, two new payroll fields, namely, BONDS and PHONE CONCESSION are to be added to this output segment. Default decimal values of 0.00 are to be assigned to these new fields. Output segment OX02 is also a fixed length segment without a key.

4. Input segment IX04 (block 804 in FIG. 9) is a controlled variable length segment (that is, varying areas of the segment are controlled by counters) having these fields: HIGHEST DEGREE, UNIVERSITY, GRAD. DATE, NO. CO. COURSES (number of company courses), COMPANY COURSES, NO. ACADEMIC COURSES, and ACADEMIC COURSES-JR (job related). With respect to the fields that are variable:

(a) NO. CO. COURSES contains a counter for the number of occurrences of COMPANY COURSES;

(b) COMPANY COURSES is a variably occurring field having NAME and DATE sub-fields;

(c) NO. ACADEMIC COURSES contains a counter for the number of occurrences of ACADEMIC COURSES-JR; and (d) ACADEMIC COURSES-JR is a variably occurring field having sub-fields of NAME, GRADE and CREDITS.

There can be zero occurrences of COMPANY COURSES and ACADEMIC COURSES-JR.

This input segment is to be split into three output segments, namely, OX03, OX04 and OX05 (blocks 903, 906 and 904, respectively, of FIG. 10). Output segment OX03 is a fixed length segment that contains the following fields: DEGREE, DEGREE NAME, UNIVERSITY and GRAD. DATE. The DEGREE field is the key field for this segment.

Output segment OX04, a child of output segment OX03, is a fixed length segment with the potential for twin segments and has the following fields: NAME, GRADE, CREDITS, JOB RELATED (a one-character YES/NO flag) and NOTES. The first three fields are contiguous in both the input and output segments so they may be grouped for mapping. NAME is the key field.

Output segment OX05 is a variable controlled segment containing the following fields: NO. CO. COURSES (a counter for the number of company courses) and COMPANY COURSES, which is a variably occurring field including sub-fields NAME, CODE, DATE and HOURS. The NAME and DATE are contiguous sub-fields in the input segment, but they are split and moved to non-contiguous output fields. (This requires that certain data be moved to temporary work areas before being moved to the output segment).

5. Input segment IX05 (block 805 of FIG. 9) is a variable uncontrolled segment (that is, there is a variably occurring area in the the segment not controlled by a counter) that contains these fields: RECRUITER NAME, INTERVIEW DATE, INTERNAL TRANSFER and PREVIOUS EMPLOYERS. The last field is variably occurring. This segment is not necessarily present upon transition. If it is, then in the output segment OX06, (block 905 of FIG. 10) only the PREVIOUS EMPLOYER data is to be stored in a variable uncontrolled segment. The RECRUITER NAME and INTERNAL TRANSFER data is merged into output segment OX01. The INTERVIEW DATE is to be discarded.

6. Input segment IX06 (block 806 in FIG. 9) is a fixed length segment. It contains JOB TITLES for the last three job classifications. This segment will be discarded in its entirety.

With this transitioning specification, the user is now in a position to supply the various components of information required by information source 100 of FIG. 1. If transition process 50 is executed entirely in a batch mode, the information may be supplied as a set of data and control cards that serve as input to the common software. Another procedure is for the user to supply the information interactively utilizing a display device to build the driver information of source 100 and then store this information off-line for later access by the common software. For the present example, the interactive mode is presumed and typical terminal display screens are depicted for illustrative purposes.

Input dictionary 120 is composed of a listing, in hierarchical order, of the required field entries from all input segments that are to be transitioned to the output database. The data arrangement of Table I depicts information, derived from the transitioning specification for input segment IX01, that defines the entry in input dictionary 120 for the root segment IX01.

TABLE I

| | | (INPUT 1) | | | |
|---|---|---|---|---|---|
| HUMONIC | FID | LH | TYPE | LL | COMMENT |
| EMPC | IX0110 | 3 | N,R | 1 | Employee Code |
| NM | IX0120 | 25 | C,L | 1 | Name |
| SS# | IX0130 | 9 | N,R | 1 | Social Security No. |
| JOBF | IX0140 | 15 | C,L | 1 | Job Function |
| START | IX0150 | 6 | M,L | 1 | Start Date |

The column labelled HUMONIC contains entries that are user-defined alias names for the corresponding entry on the corresponding row, and has no effect on the transition.

Tables II, III and IV show the arrangement of data serving as input to dictionary 120 for input segments IX02, IX03 and IX04, respectively. The information in Tables II and III follows the same pattern described with respect to Table I. However, Table IV requires additional explanation.

TABLE II

| | | (INPUT 2) | | | |
|---|---|---|---|---|---|
| HUMONIC | FID | LH | TYPE | LL | COMMENT |
| STR | IX0210 | 20 | C,L | 1 | Street |
| CTY | IX0220 | 10 | A,R | 1 | City |
| ST | IX0230 | 2 | C,L | 1 | State |
| ZIP | IX0240 | 5 | N,R | 1 | Zip |
| PH | IX0250 | 12 | N,R | 1 | Home Phone |

TABLE III

| | | (INPUT 3) | | | |
|---|---|---|---|---|---|
| HUMONIC | FID | LH | TYPE | LL | COMMENT |
| GR | IX0310 | 10 | N,R | 1 | Gross Pay |
| FED | IX0320 | 8 | N,R | 1 | Federal Tax |
| FICA | IX0330 | 8 | N,R | 1 | Social Security Tax |
| SUI | IX0340 | 6 | N,R | 1 | State Insurance |
| NET | IX0350 | 10 | N,R | 1 | Net Pay |

TABLE IV

| | | (INPUT 4) | | | | |
|---|---|---|---|---|---|---|
| HUMONIC | FID | FID;LH | CT | TYPE | LL | COMMENTS |
| | IX0400 | | | V | | Variable Segment |
| | IX0401 | 60 | 50 | | | Control for C Crs. |
| | IX0402 | 80 | 70 | | | Control for A Crs. |
| SLF | IX0410 | 2 | | B,R | 1 | Segment Length |
| DEGREE | IX0420 | 3 | | A,L | 1 | Degree |
| UNIV | IX0430 | 20 | | A,L | 1 | University |
| DATE | IX0440 | 6 | | M,R | 1 | Grad. Date |
| #CC | IX0450 | 2 | | N,R | 1 | No. Co. Courses |
| | IX0460 | 90 | | | 1 | Co. Courses |
| COCC | IX0461 | 18 | | C,L | | Name, Date |
| #AC | IX0470 | 2 | | N,R | 1 | No. Acad. Courses |
| | IX0480 | 69 | | | 1 | Acad. Courses |
| AOCC-JR | IX0481 | 23 | | C,L | | Name, Grade, Credits | entries in the FID column. Thus, the readily understood alias names, rather than the FID entries, may conveniently be used later in instructions defined by map table 130 and derivation table 150 of source 100. The entries in the FID column are a sequential listing of the fields within segment IX01. Each field has a predetermined length and its length, in bytes, is shown in the LH column. For instance, field 2 of input segment IX01 has been allocated 25 bytes and has the HUMONIC name NM. The information in the TYPE column indicates the type and justification of the field data. Among the acceptable types are: N (integer), D (decimal), C (character), and M (month,day,year in MMDDYY format) as well as B (binary) and A (alphabetic). The justification is either right (R) or left (L). The LL field (LL is a contracted form of LEVEL) contains either a 1 or a 2. A level-1 field is called a primary field. A segment must be defined so that the entire segment is accounted for by level-1 entries; fields described by level-1 entries cannot overlap. As will be illustrated later, a level-2 field may be an expansion or contraction of a number of level-1 fields and is defined so that a user may access and move portions of the level-1 fields. The COMMENT column allows the user to enter notes appropriate to any Input segment IX04 is a controlled variable segment; the variable nature of the segment is indicated by the "V" as the first entry in the TYPE column. The FID for this segment is listed in the first row as IX0400 and the first five alphanumeric characters of this FID, namely IX040, define a stem. Any other FIDs with this stem point to the location of the variably occurring data. In particular, the second entry has the stem IX040 and FID IX0401. The one in the last position of this FID indicates that this is the first variably occurring field to be processed. The next entry in this row, namely "60" under the FID;LH heading, points to the start of the first occurrence, if it is present. If an entry in the FID;LH column is to be interpreted as a FID, it is presumed to have the input segment identifier as a prefix. In this case, the entry "60", in fully expanded form, becomes IX0460, which is the entry in the ninth row of TABLE IV.

Focusing for the moment on the ninth and tenth rows of the table (the overall length entry and the immediately following entry are always considered in pairs), the data entries of "90" and "18" in the FID;LH column indicate that the total number of bytes allocated to this varying area of this segment is 90 whereas each occurrence within this area has a length of 18 bytes—12 bytes for course number, 6 bytes for date. (Sub-fields in an occurrence cannot be defined in this entry. If they are needed as sub-fields, the occurrence must be moved to a temporary area). This implies that up to five separate data groupings may be stored in this varying area. The actual number of 18-byte data groupings is tracked via a counter. The location of this counter is pointed to by the contents of the CT column in the entries beginning with the stem for each field that varies. For FID IX0401, the counter FID is IX0450 since a "50" appears in the CT column for this second FID entry. The counter has been allocated two bytes and it stores numeric integer, right (N,R) adjusted type data.

The third row in the table also points to variably occurring data. The FID IX0402 contains the stem for this segment and the digit two in the last position indicates that this is the second varying field and it will be processed accordingly. Analagous to the first varying field, the second varying field is identified by FID IX0480 and is 69 bytes in overall length. Moreover, each occurrence is 23 bytes long (15 for name, 3 for grade and 5 for credits) implying a maximum of three occurrences. The counter for the actual number of occurrences is located by FID IX0470 and is allocated two bytes.

The fourth row in Table IV, having the Humonic SLF (Segment Length Field), immediately follows the last variably occurring field definition. A convention of a hierarchical database is that of placing the length of the overall segment at the front of a variable length segment to aid in keeping track of the data within the segment. In effect, it is a counter that has been allocated two bytes for binary, right-adjusted data.

The remaining entries in Table IV follow the same pattern discussed above with respect to Table I.

The last input segment requiring definition is segment IX05 and its dictionary entry is given by Table V below.

TABLE V

| | | (INPUT 5) | | | |
|---|---|---|---|---|---|
| HUMONIC | FID | FID; LH | TYPE | LL | COMMENT |
| | IX0500 | | V | | Variable Segment |
| | IX0509 | 50 | | · | Uncontrolled |
| SLF | IX0510 | 2 | B,R | 1 | Segment Length |
| RNM | IX0520 | 20 | A,L | 1 | Recruiter Name |
| IDATE | IX0530 | 6 | M,L | 1 | Interview Date |
| TRANS | IX0540 | 1 | A,R | 1 | Internal Transfer |
| | IX0550 | 100 | | 1 | Previous Employers |
| EMDL | IX0551 | 20 | A,L | | Individ. Employers |

Input segment IX05 is an uncontrolled variable segment, with the variable nature indicated by the V in the first row of the TYPE column. In a manner similar to input segment IX04, the stem IX050 in a FID points to information about the varying area. FID IX0509 points to FID IX0550 as defining the overall length of the varying area, which is 100 bytes in this case. A stem with the digit nine in the last position always means an uncontrolled varying area. This FID entry (IX0550) as well as the next entry are again considered in pairs. The IX0551 entry indicates an occurrence length of 20 bytes, implying up to five blocks of "Previous Employer" information may be stored.

Again, since this is a variable segment, the entry immediately following the pointer to the uncontrolled varying area, namely EX0510, stores the overall length of the segment as is the convention for the management of hierarchical databases. The remaining entries in this table follow the convention discussed with respect to the previous tables.

Input segment IX06 needs no definition since this input segment is to be discarded in its entirety.

An output dictionary is defined in essentially the same format as the input dictionary, that is, the output dictionary is also composed of a listing, in hierarchical order, of the field entries which will comprise the output database. The data arrangement of Table VI depicts information, derived from the transitioning specification for output segment OX01, that defines the entry in output dictionary 140 for root segment OX01.

TABLE VI

| | | | (OUTPUT 1) | | | |
|---|---|---|---|---|---|---|
| HUMONIC | FID | LH | TYPE | LL | DF | COMMENTS |
| SS# | OX01010 | 10 | N,R | 1 | | Soc. Sec. No. (key) |
| EMPC | OX01020 | 3 | N,R | 1 | | Employee Code |
| NM | OX01030 | 30 | C,L | 1 | | Name |
| STR | OX01040 | 20 | C,R | 1 | | Street |
| CITY | OX01050 | 15 | A,R | 1 | | City |
| ST | OX01060 | 2 | C,L | 1 | | State |
| ZIP | OX01070 | 10 | N,R | 1 | | Zip |
| HPH | OX01080 | 12 | N,R | 1 | | Home Phone |
| JOBF | OX01090 | 15 | C,L | 1 | | Job Function |
| START | OX01100 | 6 | M,L | 1 | | Start Date |
| RNM | OX01110 | 20 | A,L | 1 | | Recruiter Name |
| TRANS | OX01120 | 1 | A,R | 1 | | Internal Transfer |
| WPH | OX01130 | 12 | N,R | 1 | (Blank) | Work Phone |

The entries in this Table utilize the basic convention established in defining the tables for the input segments. For instance, it is recognized that output segment OX01 is a fixed length segment. All entries except the last one (WPH) are rearranged versions of input database information. However, the lengths (LH) of certain entries (SS#, NM, CITY, ZIP) have been extended and one type (STR) has been changed. The WPH (work phone) entry is defined by the same parameters as the HPH (home phone) entry. An additional column, designated DF (a shortened form of Default), allows for the automatic creation of default data and the entry of this data into the corresponding field upon transitioning. Thus, the twelve bytes of WPH will be filled with blanks in the output database. This presumably means that, upon subsequent accesses to the newly formed database, the user will supply the necessary information. These accesses, however, are not part of the transitioning process.

The table entries for the rest of the output segments OX02 through OX06 are summarized by Tables VII–XI, respectively, as follows:

TABLE VII

| | | | (OUTPUT 2) | | | |
|---|---|---|---|---|---|---|
| HUMONIC | FID | LH | TYPE | LL | DF | COMMENTS |
| GR | OX0210 | 10 | N,R | 1 | | Gross Pay |
| FED | OX0220 | 8 | N,R | 1 | | Federal Tax |
| FICA | OX0230 | 8 | N,R | 1 | | Social Security Tax |
| SUI | OX0240 | 8 | N,R | 1 | | State Insurance |
| BONDS | OX0250 | 8 | D,R | 1 | 0.00 | Bonds |
| CONC | OX0260 | 8 | D,R | 1 | 0.00 | Concession |
| NET | OX0270 | 10 | N,R | 1 | | Net Pay |

TABLE VIII

| | | | (OUTPUT 3) | | | |
|---|---|---|---|---|---|---|
| HUMONIC | FID | LH | TYPE | LL | DF | COMMENTS |
| DEGREE | OX0310 | 3 | A,L | 1 | | Degree (key) |
| DEGREEN | OX0320 | 25 | A,L | 1 | | Degree Name |
| UNIV | OX0330 | 20 | A,L | 1 | | University |
| DATE | OX0340 | 6 | M,R | 1 | | Grad. Date |

TABLE IX

| | | | (OUTPUT 4) | | | |
|---|---|---|---|---|---|---|
| HUMONIC | FID | LH | TYPE | LL | DF | COMMENTS |
| AOCC-JR | OX0410 | 23 | C,L | 1 | | Name (key), Grade, Credits |
| JR | OX0420 | 1 | A,L | 1 | Y | Job Related |
| NOTES | OX0430 | 40 | C,L | 1 | | Notes |

TABLE X

| | | | (OUTPUT 5) | | | |
|---|---|---|---|---|---|---|
| HUMONIC | FID | FID; LH | CT | TYPE | LL | DF | COMMENTS |
| | OX0500 | | | V | | | Variable Segment |
| | OX0501 | 30 | 20 | | | | Controlles |
| SLF | OX0510 | 2 | | B,R | 1 | | Segment Length |
| #CC | OX0520 | 2 | | N,R | 1 | | No. Co. Courses |
| | OX0530 | 580 | | | | 1 | Co. Courses |
| COCC | OX0531 | 29 | | C,L | | | Name, Code, Date, Hr. |

TABLE XI

| | | | (OUTPUT 6) | | | |
|---|---|---|---|---|---|---|
| HUMONIC | FID | FID; LH | TYPE | LL | DF | COMMENTS |
| | OX0600 | | V | | | Variable Segment |
| | OX0609 | 20 | | | | Uncontrolled |
| SLF | OX0610 | 2 | B,R | 1 | | Segment Length |
| | OX0620 | 180 | | | 1 | Previous Employers |
| EMPLI | OX0621 | 60 | A,L | | | Individual Employers |

Figure 11:
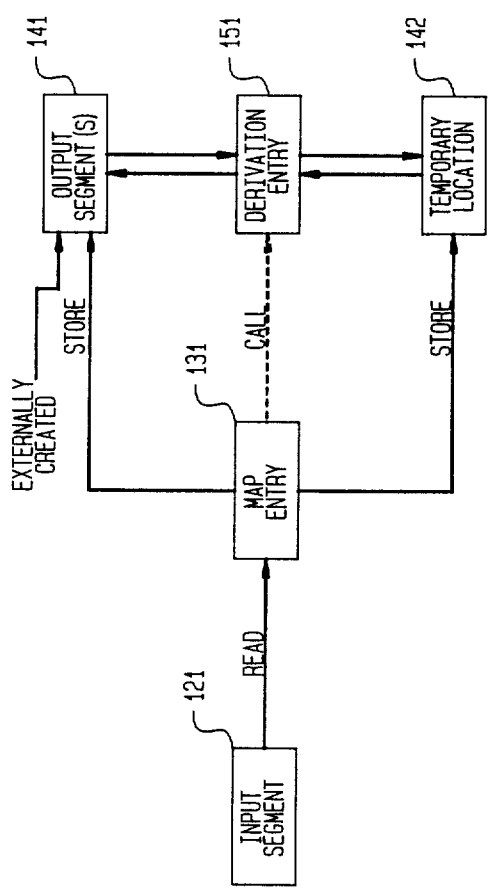
FIG. 11 depicts the interaction between the various subcomponents of information source 100 of FIG. 1.

With the creation of both input dictionary 120 and output dictionary 140, the user is now in a position to prepare map table 130 and derivation table 150. The interplay between the operations defined by tables 130 and 150 with the input and output segments is depicted in FIG. 11. Basically, there is one map entry 131 in map table 130 for each input segment 121 defined by input dictionary 120. The mapping operations comprise a combined READ and STORE or a CALL. The former operation transfers data either to one or more permanent output segments 141 or to a temporary memory area 142; this temporary area 142 is defined in the same manner as any output segment and is therefore considered a part of dictionary 140. The latter CALL operation initiates a series of steps defined by derivation entry 151 in derivation table 150. Derivation entry 151 may operate on both permanent output information 141 and temporary data 142 and the entry may effect a transfer of data between output segment storage 141 and temporary storage 142. As is also indicated, new data entries not derived from any input segment 121 may be suplied to output segment 141 via the EXTERNAL input path after transition is complete.

Map table 130 is composed of a listing of the required field entries from all input segments and the correspondence of these input fields to output fields or temporary data locations. Moreover, map table 130 may have interspersed calls to derivation table 150 for such operations as an unconditional writing of data or comparison of data stored in output location 141 and temporary location 142. The data arrangement of Table XII depicts information, derived from the transitioning specification, that defines the entry in map table 130 for root segment IX01.

TABLE XII

| (MAP 1) | | | |
|---|---|---|---|
| FROM (SEQ) | TO (SEQ) | OPTION | INFO |
| EMPC | EMPC | | |
| NM | NM | | |
| SS# | SS# | D | EXD1 |
| JOBF | JOBF | | |
| START | START | | |

The column labelled FROM (SEQ) lists the HUMONICS defined by Table I, which is the entry in input dictionary 120 for root segment IX01. Similarly, the TO (SEQ) column lists the HUMONICS for a portion of output segment OX01. Other data to populate OX01 will be derived from input segments IX02 and IX05, as will be illustrated shortly. Two other fields, namely, OPTION and INFO, are shown in Table XII, and each has an entry on the SS# line. The "D" entry initiates a call to a derivation table and the name of the table to be invoked is EXD1; its operation will be discussed later.

The data contained in the input field listed in the FROM (SEQ) column is moved to the output or temporary field listed in the TO (SEQ) column. If a derivation call is contained in a row, it is processed immediately after the data movement in that row.

Tables XIII through XV show the map entries corresponding to input segments IX02 through IX04, respectively. The entries follow the same pattern described with respect to Table XII. However, Table XV requires additional explanation.

TABLE XIII

| (MAP 2) | | | |
|---|---|---|---|
| FROM (SEQ) | TO (SEQ) | OPTION | INFO |
| STR | STR | | |
| CTY | CTY | | |
| ST | ST | | |
| ZIP | ZIP | | |
| PH | HPH | | |

TABLE XIV

| (MAP 3) | | | |
|---|---|---|---|
| FROM (SEQ) | TO (SEQ) | OPTION | INFO |
| GR | GR | | |
| FED | FED | | |
| FICA | FICA | | |
| SUI | SUI | | |
| NET | NET | | |

TABLE XV

| (MAP 4) | | | |
|---|---|---|---|
| FROM (SEQ) | TO (SEQ) | OPTION | INFO |
| DEGREE | DEGREE | | |
| UNIV | UNIV | | |
| DATE | DATE | | |
| #CC | #CC | D | EXD2 |
| COCC (1) | INCC | D | EXD3 |
| COCC (2) | INCC | D | EXD3 |
| COCC (3) | INCC | D | EXD3 |
| COCC (4) | INCC | D | EXD3 |
| COCC (5) | INCC | D | EXD3 |
| AOCC-JR (1) | AOCC-JR | D | EXD4 |
| AOCC-JR (2) | AOCC-JR | D | EXD4 |
| AOCC-JR (3) | AOCC-JR | D | EXD4 |

Rows five through nine of Table XV list the HUMONIC COCC under the FROM (SEQ) heading as well as the sequence (SEQ) numbers 1, 2, . . . , 5, in parenthesis, associated with COCC. It is recalled that COCC is a variably occuring field with up to five occurrences—hence the sequence numbers 1 through 5. In each instance, COCC data is mapped to a temporary location designated INCC. This is known to be a temporary location because none of the entries for permanent output segments (Tables VI-XI) have listed this particular HUMONIC.

A temporary storage location is utilized since it is required to split the subfields within each COCC, namely, a course name of 12 bytes and a course date of 6 bytes when moving from input to output segment. The temporary table defining this storage allocation is given below by Table XVI:

TABLE XVI

| (TEMP) | | | | | | |
|---|---|---|---|---|---|---|
| HUMONIC | FID | LH | TYPE | LL | DF | COMMENTS |
| INNM | EXT10 | 12 | C,L | 1 | | Name |
| INDT | EXT20 | 6 | M,L | 1 | | Date |
| INCC | EXT30 | 18 | C,L | 2 | | |
| ONM | EXT40 | 15 | C,L | 1 | | Name |
| OCD | EXT50 | 5 | C,L | 1 | XXX | Code |
| ODT | EXT60 | 6 | M,L | 1 | | Date |
| OHRS | EXT70 | 3 | C,L | 1 | 3 | Hours |
| OTCC | EXT80 | 29 | C,L | 2 | · | |

The format of this table is the same as any entry for output dictionary 140. The third row lists the INCC entry with a length of 18 bytes. Since this is a level 2 entry, it may be an expansion or contraction of level 1 fields. When the 18 byte length is overlayed on previous level 1 fields, it is seen that the two preceding table entries, namely, INNM and INDT, are encompassed by this level 2 entry. The 12 byte part is the course name, whereas the 6 byte part gives the course date. With this technique, new HUMONIC names have been associated with sub-fields of the field COCC, and these new names may be manipulated as required. One particular manipulation, known as field splitting, will be discussed shortly along with the remaining entries in this temporary table.

With reference again to map Table XV, the last three rows represent entries for the variably occurring field AOCC-JR. This field has the potential for a maximum of three occurrences being present—hence the sequence numbers 1, 2 and 3 in parenthesis in the FROM (SEQ) column. The actual number of entries will be transitioned to twin segments in the output database. This fact is conveyed by the AOCC-JR entries in the last three rows of the TO (SEQ) heading, that is, there are no sequence numbers associated with the output data in contrast to the input specification for AOCC-JR under the FROM (SEQ) heading. Finally, with respect to this table, there are a number of derivation calls to three different derivation entries, namely, EXD2, EXD3 and EXD4. Their structure and operation will be discussed below.

The last map table entry for this example is given by Table XVII.

TABLE XVII

| (MAP 5) | | | |
|---|---|---|---|
| FROM (SEQ) | TO (SEQ) | OPTION | INFO |
| RNM | RNM | | |
| TRANS | TRANS | D | EXD5 |
| EMPL (1) | EMPL (1) | D | EXD6 |
| EMPL (2) | EMPL (2) | D | EXD6 |
| EMPL (3) | EMPL (3) | D | EXD6 |
| EMPL (4) | EMPL (4) | D | EXD6 |

TABLE XVII-continued

| (MAP 5) | | | |
|---|---|---|---|
| FROM (SEQ) | TO (SEQ) | OPTION | INFO |
| EMPL (5) | EMPL (5) | D | EXD6 |

The last five entries have sequence numbers in both the FROM and TO columns, thereby indicating that the input field occurrences present are to map into a single output variable segment rather than twin segments.

A derivation entry is called for a number of purposes including field data creation is contingent upon the value contained in, or the existence of, one or more other fields; when data already moved to permanent output or temporary fields must be manipulated; and when segments must be prepared for writing or written out from memory. A derivation entry in derivation table 150 is invoked by an entry in map table 130. A particular derivation entry may be called repeatedly from a given map entry, but each transfer to a derivation entry will execute the entire contents of that entry. There are two basic types of instructions that are specified by a derivation entry, namely, segment control and data movement.

With respect to segment control, certain derivation instructions are used to write out (unstack) specific segments as they have been completed. Because segments can be written upon completion, there is no need to hold an entire database or even an entire database record within memory, thereby increasing the size of the databases that may be transitioned. Before any segment is written, it is necessary to issue a key ready (KR) instruction whenever the key, if the segment is keyed, has been prepared. Also, all segments within the hierarchical path above the segment being written must have had a KR instruction issued.

A simple example of a derivation entry in table 150 is shown by Table XVIII, which is the entry recited by map Table XII. The key for OX01 is SS#, so as soon as the data for this key is moved to the memory location of OX01, the KR instruction is issued; the associated segment whose key is to be readied is shown under the heading labelled TARGET in Table XVIII.

TABLE XVIII

| (DERIVATION 1-EXD1) | | |
|---|---|---|
| TARGET | OPER | OPTION |
| OX01 | | KR |

Unstacking (writing one or more segments) can be unconditional (UN) or conditional (US). A segment can be written unconditionally when it is known at a specific point that all the data needed to complete that segment has been moved to it.

When an output segment contains unpredictable data, that is, data from multiple input segments, one or more of which may or may not be present in an input database record, and/or it contains data from variably occurring input fields, there is no specific field at which it is known that all the data for this output segment has been moved to it. To facilitate determining the output segment to be complete, so it can be written, the conditional unstack (write) option is used. The user specifies in the OPER column one or more fields whose presence in the input stream indicates that variably occurring input data fields are exhausted or an input segment is not present in an input database record. An example of each is contained in the next derivation entry, which is one of three called by map Table XV:

TABLE XIX

| (DERIVATION 2-EXD2) | | |
|---|---|---|
| TARGET | OPER | OPTION |
| OX03 | | KR |
| OX03, OX02 | | UN |
| OX05 | AOCC-JR, IX05 | US |
| OX05, OX01 | IX01 | US |
| OX06, OX05, OX01 | | * |

The first entry in Table XIX indicates that segment OX03 has had its key (DEGREE) prepared. It would have been possible to issue a call to a derivation entry containing a KR instruction on the first line of map Table XV, but as long as a KR issues before the write statement for that segment or any of its children, the strategy of when to issue a KR call is user dependent. Here, many operations have been combined into one derivation listing for conciseness.

The second entry, labelled UN in the OPTION column, indicates that the segment or segments pointed to by the TARGET are to be written out from memory. To this point in the mapping operation, all the data for segments OX02 and OX03 has been stored and the two pertinent KR commands have been issued. Since this derivation entry (Table XIX) is called from map Table XV after #CC has been moved from input segment IX04 to output segment OX03, at this point segment OX02 has been completed (and could have been unconditionally written once NET was moved from IX03 to OX02) and new segment OX03 has been completed. (OX03 could also have been written sooner, i.e. once DATE (grad. date) was moved.) Neither of these segments contains unpredictable data, and therefore OX03 and then OX02 are written unconditionally as indicated under the TARGET heading.

The third entry, labelled US in the OPTION column, is used for a "look-ahead" comparison which constitutes a conditional unstack. If the next incoming FID matches any of the FIDs in the OPER column, the condition is met and the segments under the TARGET heading may be unstacked (written). Segment OX05 contains unpredictable data from IX04, i.e. COCC (company course occurrences). For this example, if the next FID is either AOCC-JR or any FID defined within input segment IX05, implying that there are no COMPANY COURSES, then output segment OX05 is complete and may be written.

The fourth entry in Table XIX is also a conditional unstack with the input segment IX01 serving as the test parameter. Since it is possible that there are no job related academic courses nor the previous employment history segment, the next FID may be from the root segment IX01. In this case, both OX05 and OX01 are ready to be written. OX01 could not be written until it could be determined whether the IX05 data fields were present to move to OX01.

The last entry in Table XIX is an entry which must be present in any derivation table containing a conditional unstack (US) entry. It defines the segments to be written when the end of the input field data stream is reached when the look-ahead comparison is attempted. The segments contained in the TARGET field in this entry replace the segments contained in the TARGET field of the US entry being processed when the end-of-file is detected. The segments noted in the TARGET field of this * entry should be the union of all noted in any US entry in any derivation table. Extraneous, unpopulated segments substituted at the end-of-file detection are not written.

The next entry in derivation table 150 is provided by Table XX, which is also called from map Table XV:

TABLE XX

| (DERIVATION 3-EXD3) | | |
|---|---|---|
| TARGET | OPER | OPTION |
| ONM | INNM | I |
| ODT | INDT | I |
| COCC (x) | OTCC | I |
| OX05 | AOCC-JR, IX05 | US |
| OX05, OX01 | IX01 | US |
| OX06, OX05, OX01 | | * |

This entry introduces the data movement type of derivation instruction. In particular, the "I" designator in the OPTION column indicates that the data represented by the HUMONIC in the OPER column is moved to the location represented by the HUMONIC in the TARGET column. Thus, INNM and INDT are moved to ONM and ODT, respectively.

To determine the effect of this movement, reference is again made to temporary TABLE XVI. It is seen that the 12 bytes of INNM are moved into the 15 byte field ONM, whereas the data of INDT becomes the data identified with ODT. The last entry in TABLE XVI is the level-2 field entry OTCC with a length of 29 bytes. Overlaying this entry on previous level-1 entries, the sub-fields ONM, OCD, ODT and OHRS are encompassed by OTCC and thereby define the sub-fields of OTCC.

Referring again to Table XX, the third row defines a move operation whereby the data of OTCC becomes the data of the variably occurring output field COCC (x), where x varies from 1 through 5 whenever #CC in IX04 is different than zero. The fourth and fifth entries in this table effect operations similar to the third and fourth entries of Table XIX, because after each COCC occurrence is moved from IX04, it must be determined if there is more data present to be moved to OX05 and- /or OX01. The last entry in this table has the same purpose as the last entry in Table XIX.

Finally, Tables XXI, XXII and XXIII define the derivation entries corresponding to EXD4, EXD5 and EXD6, respectively. The operations performed by these entries are similar to the ones previously discussed.

TABLE XXI

| (DERIVATION 4-EXD4) | | |
|---|---|---|
| TARGET | OPER | OPTION |
| OX04 | | KR |
| OX04 | | UN |
| OX01 | IX01 | US |
| OX06, OX05, OX01 | | * |

TABLE XXII

| (DERIVATION 5-EXD5) | | |
|---|---|---|
| TARGET | OPER | OPTION |
| OX01 | | UN |

TABLE XXIII

| DERIVATION 6-EXD6) | | |
|---|---|---|
| TARGET | OPER | OPTION |
| OX06 | IX01 | US |
| OX06, OX05, OX01 | | * |

Although only one type of data movement was exemplified in this Employee Profile example, it is clear that one skilled in the art may anticipate other readily defined map and derivation operations such as, for example: (1) selecting the largest value in the OPER column and moving this selected value to the TARGET column; (2) concatenating the data in the OPER column and moving the concatenated value to the TARGET column; (3) if one of various conditions a data field is tested for is true, skip the next N instructions; (4) field content alterations such as altering justification of significant data; (5) date transitions; and (6) field expansion and truncation.

Having prepared the detailed contents of source 100 in a form required by the common software implementing transitioning process 50, the user is now prepared to initiate execution of the extractor and mapper portions of process 50. As already described in overview fashion in the previous section, extractor process 300 is executed initially. A flow diagram detailing the operational steps of extractor process 300 is shown in FIG. 12.

Figure 12:
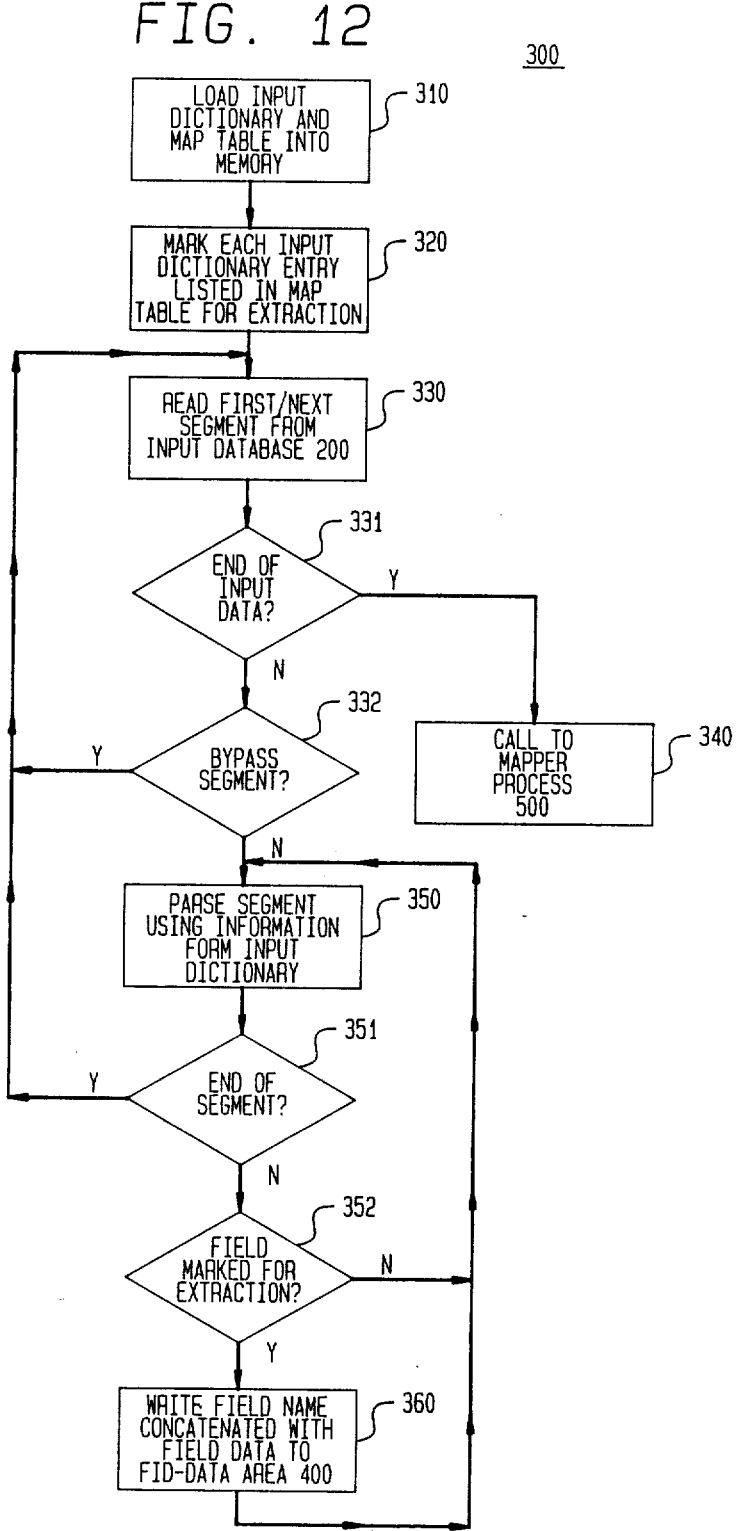
FIG. 12 is a detailed flow diagram of extractor process 300.

With reference to FIG. 12, the first step performed by process 300, as represented by block 310, is that of loading the entries of input dictionary 120 and map table 130 into the memory of the computer system. In order to determine which fields to bypass upon extraction, each entry in input dictionary 120 having a corresponding entry in map table 130 (that is, a FID in dictionary 120 appearing as a FROM (SEQ) entry in table 130) is marked accordingly and stored in an internally generated and maintained reference table; this step is represented by block 320. To exemplify this step of marking, all entries provided by Table V except IDATE are marked; since IDATE does not appear as an entry in map table 130, it is to be bypassed.

The third step, depicted by block 330, is that of reading either the first segment from unloaded input database 200 upon entry from block 320 or the next segment upon entry from blocks 332 and 352. Decision block 331 following block 330 initiates a call to block 340, representative of a call to mapper process 500, upon an "end-of-file" designation for input database 200.

Next, decision block 332 tests for total segment bypass. An example of a total segment to be bypassed is segment IX06 of FIG. 9. It does not have any map entry (or even a dictionary entry) with this segment name so its data is ignored. If the segment under consideration is not bypassed, the segment is parsed within block 350 for its information content on a field-by-field basis with reference to the dictionary table corresponding to the input entries in dictionary 120. All fields are tested within decision block 352, and those marked for extraction are written, via block 360, as FID-data pairs into data storage area 400. Upon the end of an input segment, decision block 351 directs program control to block 330. Moreover, decision block 352 returns control to block 350 whenever a field is not extracted and block 350 also obtains program control at the end of a write within block 360.

Figure 13:
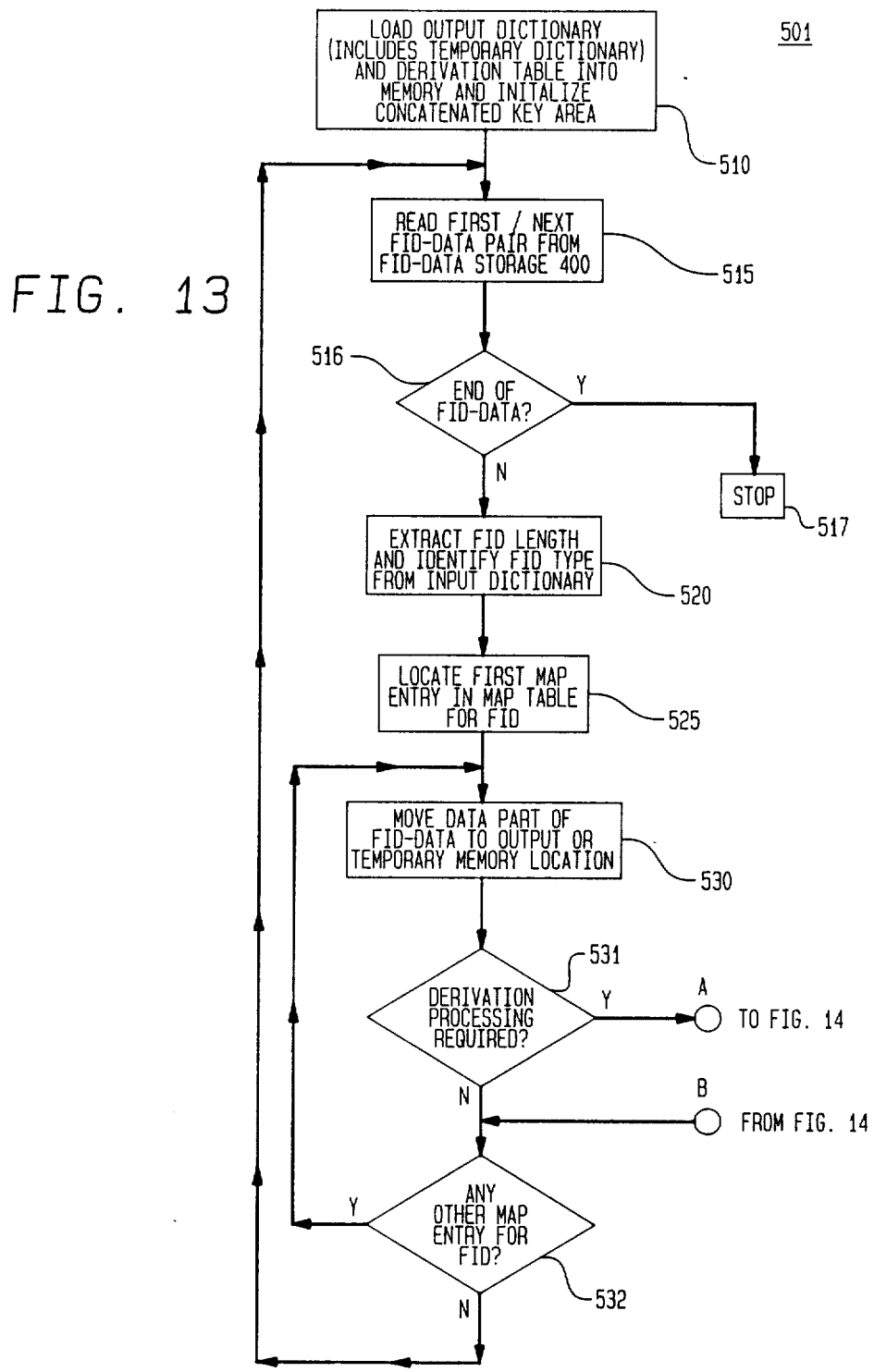
FIGS. 13 and 14 provide a detailed flow diagram for mapper process 500.
Figure 14:
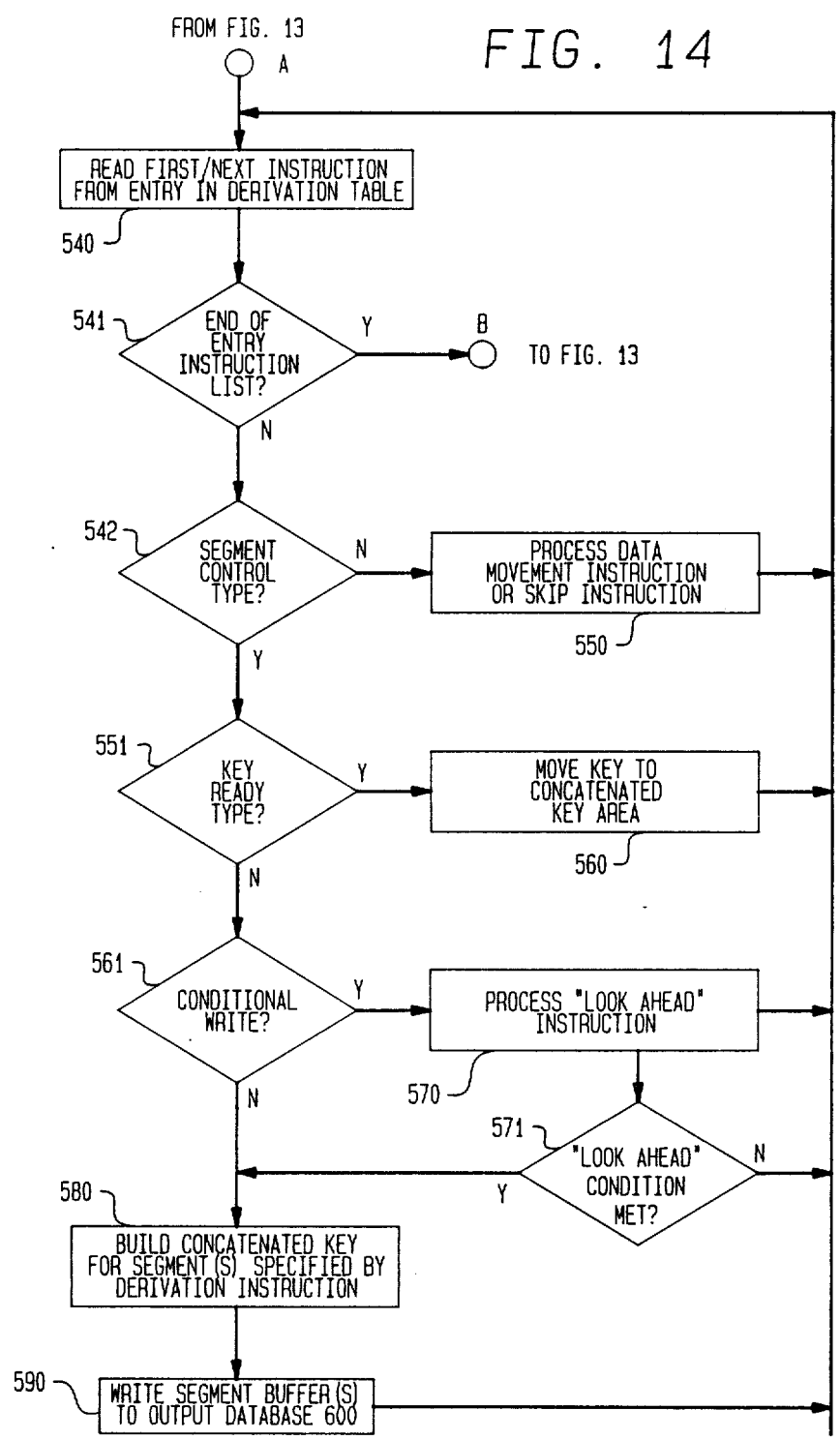

The next major processing stage, namely, mapper process 500, is invoked subsequent to storing all pertinent input data in FID-data area 400. A flow diagram detailing the operation steps of mapper process 500 is shown in the combination of FIGS. 13 and 14. FIG. 13 presents the program flow for iterative process 501 of FIG. 1, whereas FIG. 14 details the program flow for derivation process 502 of FIG. 1.

With the focus on FIG. 13 initially, the first subprocess performed within iterative process 501, as represented by block 510, is that (i) of loading the entries of output dictionary 140 and derivation table 150 into memory, thereby providing direct memory access to all subcomponents of source 100, and (ii) initialization of concatenated key area.

The concatenated key has not been previously discussed since its utilization is basically transparent to the user. However, to prepare output database 600 for eventual rearrangement, for example, into hierarchical format, certain conversion information must be collected and saved along with the mapped data. This information is deposited in the concatenated key area.

Figure 15:
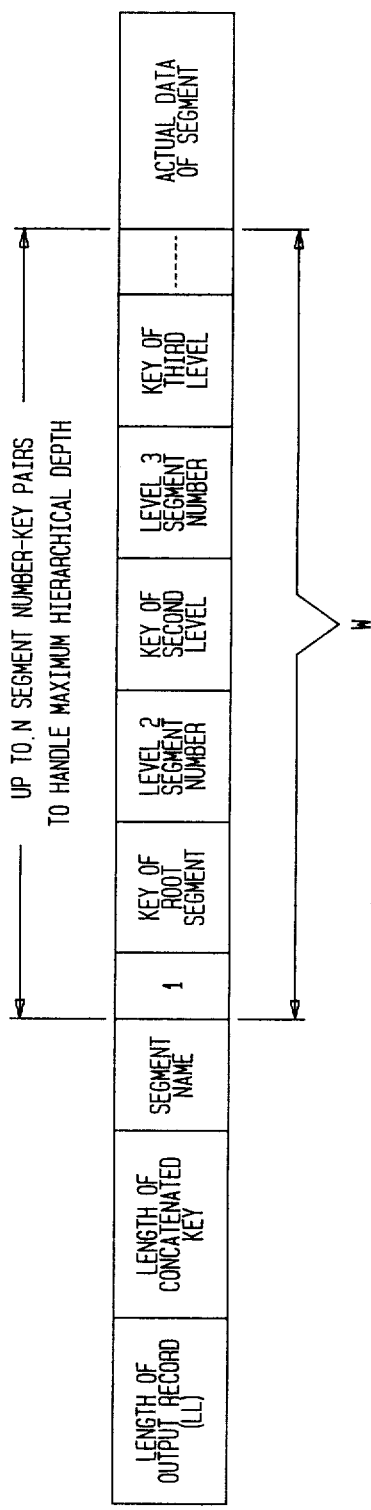
FIG. 15 depicts the concatenated key structure for the output database.

FIG. 15 shows the basic layout of the concatenated key for each segment. Addressing first an interior portion of this area, namely the locations characterized by length "W" in FIG. 15, it is required that the user provide the information necessary to construct this portion. This could be done either on-line, say through an entry in information source 100, or off-line, say by executing a standard operating system utility on the database definition for the output database. In either case, information about the number of levels in the output database must be accessible by process 501. For instance, with reference to FIG. 10, there are three levels for the Employee Profile Database. The first level is always the root level, here OX01; a second level is comprised of segments OX02, OX03, OX05 and OX06; and a third level has only segment OX04. In one conventional IMS database management system, up to 15 levels and 255 segments are allowed.

Once the number of levels is known, it is then necessary to determine, for each level, the maximum length from the set of all key lengths at that level. Here, the root key is SOC. SEC. NO., which has a length of 10 bytes. On level 2, the only key is DEGREE (from OX03) and it has a length of 3 bytes. Finally, level 3 has only one key (NAME) of length 25 bytes. With this information, and presuming a one-byte allocation for each segment number, then W=41 bytes, which is the data for the "LENGTH OF CONCATENATED KEY" portion.

With the W portion of the concatenated key area defined, the other unfilled fields, namely, "LL" and "ACTUAL DATA" portion, are filled in immediately prior to writing the fully constructed output segment.

Referring again to FIG. 13, the next step, represented by block 515, is to read either the first FID-data pair from storage area 400 upon entry from block 510 or the next FID-data pair upon entry from decision block 532. Decision block 516 following block 515 stops overall execution of process 50 upon an "end-of-data" designation for area 400.

For the given FID, block 520 indicates that the length and type of the FID is obtained by reference to input dictionary 120 so that the boundary of the data may be established. For example, from Table I, EMPC is 3 bytes in length and it contains numeric, right adjusted data. As is indicated by block 525, the next step is to locate the first map entry for this particular FID. The first map entry for EMPC in map table 130 appears in Table XII and, according to the entry, EMPC is to be moved to the output location having the same FID name. With reference to FIG. 11, it is observed that this data movement is the most direct in that data is moved from input to output without the need to store the data in a temporary location or to call a derivation entry.

As shown in FIG. 13, the processing step represented by block 530 accomplishes either the direct data movement or movement of data to a temporary location. An instance of this latter situation is exemplified by input Table IV, map Table XV and Temporary Table XVI, wherein each COCC(x), x=1 to 5, is moved to temporary location INCC for further manipulation.

As is indicated by decision block 531 following processing block 530, it is also possible to branch to derivation processor 502 of FIG. 14 upon an appropriate entry in map table 130. As a continuation of the situation above, after the movement of COCC(x) to a temporary location, derivation Table XX (EXD3) is called for instructions on the processing required for the temporary data stored in INCC.

The last block in the flow of iterative process 501, namely decision block 532, returns control to block 530 if the particular FID under consideration has one or more additional entries (e.g., if an input field is required to be moved to two different output or temporary areas) or returns control to block 515 for processing of the next FID (e.g., EMPC has only a single map entry, as do all other entries in the tables).

Referring now to FIG. 14, derivation process 502 commences with the read operation represented by block 540. The information read is provided as an entry in the appropriate instruction list comprising derivation table 150. A branch to derivation process 502 from iteration process 501 causes the first instruction in the list to be read; otherwise, the instruction following the last processed instruction in the list is the one considered.

Decision block 541 returns control to iteration process 501 if all entries in the particular list have been sequentially processed. If not, decision block 542 is entered to test whether the instruction is of the segment control type. If it is not, the instruction is of the data manipulation type, which encompasses all of the possible data manipulations the designer of the common software selects to embed within the common software, but generally excludes the Key Ready and conditional and unconditional write operations which indicate the data manipulations are complete and data is ready for storage. Block 550 represents the processing effected for a data manipulation instruction.

An exemplary data manipulation type instruction is contained in Table XX, wherein the OPTION "I" command indicates that input data INNM, INDT and OTCC are to be moved to ONM, ODT and COCC(x), respectively.

If the instruction is a segment control type, decision block 551 differentiates between a Key Ready or a write instruction. For a Key Ready command, processing by block 560 is invoked, and the data stored in the FID identified as the key (identified during the same external or on-line process used to define the concatenated key fields) is moved to the concatenated key area (FIG. 15). For instance, in Table XIX (EXD2), a KR is issued for OX03 as the first instruction. Thus, as per FIG. 15 the concatenated key for the segment SEGMENT NAME OX03 has the root key filled in with the SOC. SEC. NO. of the particular employee of the record occurrence under consideration (as a result of issuing a KR in Table XVIII) as well as the DEGREE name from OX03 filled in as the second level key. The ACTUAL DATA OF SEGMENT remains to be filled. (In fact, the ACTUAL DATA OF SEGMENT is filled in and the entire output record, including the concatenated key, is written as a result of the next instruction in Table XIX).

If the instruction is of the "write" type, a test is performed within decision block 561 to determine if the write is unconditional (UN) or conditional (US). An unconditional write invokes the processing depicted by blocks 580 and 590. First, the remainder of the concatenated key areas for the segments named in the derivation instructions are filled, and then the memory locations storing the key areas and the ACTUAL DATA OF SEGMENT are written to the non-buffer area storing database 600. A conditional write causes the process of block 570 to be activated, thereby testing the "lookahead" conditions contained within the derivation instruction. A test is performed in decision block 571 to determine if the look-ahead condition has been satisfied. If it is, the process depicted by blocks 580 and 590 is invoked. Table XIX presents examples of both the UN and US type instructions, and these were elucidated in the discussion of how the user builds the table entries.

Finally, processing blocks 550, 560, 570 and 590 all return control to block 540 after each completes its execution.

It is to be further understood that the methodology described herein is not limited to the specific form disclosed, but may assume other implementations and embodiments limited only by the scope of the appended claims.

What is claimed is:

1. In a computer system having a memory and storage device, an improved method for transitioning an input hierarchical database serving as a system input to obtain an output hierarchical database, the method including the steps of generating and storing in the memory: (i) an input dictionary defining the contents of the input database; (ii) an output dictionary defining the contents of the output database, the contents including records composed of segments; and (iii) a map table having entries defining the correspondence between the input database contents and the memory, identifying, with reference to the input dictionary and the map table, the contents of the input database selected for transitioning, extracting the selected contents from the input database, and storing the extracted contents in the device in hierarchical sequence as identifier-data pairs, and sequentially processing the identifier-data pairs with reference to the input dictionary, the output dictionary and the map table, and storing data associated with each identifier as associated data in the memory, wherein the improvement to the method comprises the steps of before the step of processing, generating and storing derivation table entries in the memory, each of said entries specifying computer instructions to generate the final contents of the output database from the associated data, wherein one of said instructions: supplies comparison information expressed in terms of the associated data; and conditionally writes to the device a subset of the associated data needed to complete a corresponding subset of the output database, said conditional write executable whenever a comparison between said comparison information and the next incoming identifier in the sequence of identifier-data pairs is satisfied, before the step of processing, augmenting predetermined map table entries with preselected ones of said derivation table entries callable during the step of processing, and upon a call to said conditional write during the step of processing, performing said comparison and, when satisfied, executing said conditional write to generate said subset of the associated data and then storing said subset of the associated data in the device, whereby the improvement effects the transitioning of a large input database by a computer system having insufficient memory to store data for all segments of an output database record until all transitioning operations are completed.

2. The improved method as recited in claim 1 wherein another of said instructions issues, whenever a key of a given output database segment is specified, a key ready command to the system upon preparation of a portion of the associated data corresponding to said key, said command arranged to issue before the execution of said conditional write.

3. In a computer system having a memory and storage device, an improved method for transitioning an input hierarchical database serving as a system input to obtain an output hierarchical database, the method including the steps of generating and storing in the memory: (i) an input dictionary defining the contents of the input database; (ii) an output dictionary defining the contents of the output database, the contents including records composed of segments; and (iii) a map table having entries defining the correspondence between the input database contents and selected memory locations, identifying, with reference to the input dictionary and the map table, the contents of the input database selected for transitioning, extracting the selected contents from the input database, and storing the extracted contents in the device in hierarchical sequence as identifier-data pairs, and sequentially processing the identifier-data pairs with reference to the input dictionary, the output dictionary and the map table, and storing data associated with each identifier as associated data in the memory, wherein the improvement to the method comprises the steps of before the step of processing, generating and storing derivation table entries in the memory, each of said entries specifying computer instructions to generate the final contents of the output database from the associated data, wherein a first of said instructions unconditionally writes to the device a subgroup of the associated data needed to complete a corresponding subgroup of the output database, and wherein a second of said instructions: supplies comparison information expressed in terms of the associated data; and conditionally writes to the device a subset of the associated data needed to complete a corresponding subset of the output database, said conditional write executable whenever a comparison between said comparison information and an identifier corresponding to said subset is satisfied, and wherein a third of said instructions executes a data movement from target memory locations to destination memory locations defined by said third instruction, said destination locations storing a part of the output database, before the step of processing, generating and storing in the memory a temporary storage dictionary defining the format of data stored in predetermined ones of the selected memory locations, before the step of processing, augmenting predetermined map table entries with preselected ones of said derivation table entries callable during the step of processing, upon a call to said unconditional write during the step of processing, executing said unconditional write to generate said subgroup of the associated data and then storing said subgroup of the associated data in the device, upon a call to said conditional write during the step of processing, performing said comparison and, when satisfied, executing said conditional write to generate said subset of the associated data and then storing said subset of the associated data in the device, and upon a call to said data movement during the step of processing, identifying said target memory locations with corresponding ones of said selected memory locations and moving data in said identified target memory locations to corresponding ones of said destination memory locations, whereby the improvement effects the transitioning of a large input database by a computer system having insufficient memory to store data for all segments of an output database record until all transitioning operations are completed.

4. The improved method as recited in claim 3 wherein said conditional write is executable whenever said comparison between said comparison information and the next incoming identifier in the sequence of identifier-data pairs is satisfied.

5. The improved method as recited in claim 4 wherein another of said instructions issues, whenever a key of a given output database segment is specified, a key ready command to the system upon preparation of a portion of the associated data corresponding to said key, said command arranged to issue before the execution of said conditional write.

* * * * *